US006935204B2

(12) United States Patent
Walker et al.

(10) Patent No.: US 6,935,204 B2
(45) Date of Patent: Aug. 30, 2005

(54) AUTOMATED MANUAL TRANSMISSION AND SHIFT METHOD

(75) Inventors: Stuart J. Walker, Shropshire (GB); David B. Mason, Jr., Clayton, NC (US); David L. Dickrell, East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 22 days.

(21) Appl. No.: 10/697,797

(22) Filed: Oct. 31, 2003

(65) Prior Publication Data

US 2005/0092115 A1 May 5, 2005

(51) Int. Cl.[7] ............................................... F16H 59/00
(52) U.S. Cl. ....................................................... 74/335
(58) Field of Search .................................. 74/335, 339

(56) References Cited

U.S. PATENT DOCUMENTS

| | | |
|---|---|---|
| 4,592,249 A | 6/1986 | Lehmann et al. |
| 4,598,374 A | 7/1986 | Klatt |
| 4,766,774 A | 8/1988 | Tamai |
| 4,842,020 A | 6/1989 | Tinholt |
| 4,977,992 A | 12/1990 | Ohtsuka et al. |
| 4,981,202 A | 1/1991 | Leigh-Monstevens et al. |
| 5,305,663 A | 4/1994 | Leonard et al. |
| 5,335,566 A | 8/1994 | Genise et al. |
| 5,389,053 A | 2/1995 | Steeby et al. |
| 5,401,223 A | 3/1995 | White et al. |
| 5,415,606 A | 5/1995 | Kovalsky et al. |
| 5,416,698 A | 5/1995 | Hutchison |
| 5,487,318 A | 1/1996 | Shott |
| 5,587,905 A | 12/1996 | Yesel et al. |
| 5,611,245 A | 3/1997 | McKee |
| 5,673,592 A | 10/1997 | Huggins et al. |
| 5,738,607 A | 4/1998 | Kondo et al. |
| 5,741,202 A | 4/1998 | Huber |
| 5,743,143 A | 4/1998 | Carpenter et al. |
| 5,766,111 A | 6/1998 | Steeby et al. |
| 5,780,979 A | 7/1998 | Kim |
| 5,795,260 A | 8/1998 | Kim |
| 5,816,131 A | 10/1998 | Tornatore |
| 5,819,585 A | 10/1998 | Darnell |
| 5,819,590 A | 10/1998 | Kuwahara |
| 5,832,777 A | 11/1998 | Weilant |
| 5,867,092 A | 2/1999 | Vogt |

(Continued)

FOREIGN PATENT DOCUMENTS

DE         37 43 860 A1     7/1989

(Continued)

Primary Examiner—Dirk Wright
(74) Attorney, Agent, or Firm—Murgtroyd (57) ABSTRACT

A shift control method for an automated manual transmission is provided. The method includes the step of modulating the force applied to a shift collar, via a shift rod and/or shift fork for example, during the engagement of the shift collar and a selected gear. The method modulates the initial engagement force applied to the shift collar when the rotational speed differential between the collar and gear is being adjusted, before increasing the force again following modulation. This modulation of the force decelerates the shift collar during the rotational speed adjustment and does not accelerate the shift collar to complete the engagement until after the modulation. In this way, a less abrupt engagement of the gear may be achieved. The control method may improve the driving characteristics of the vehicle employing the transmission and may also improve the power transmission efficiency.

42 Claims, 5 Drawing Sheets

U.S. PATENT DOCUMENTS

| | | |
|---|---|---|
| 5,868,033 A | 2/1999 | Nishino et al. |
| 5,875,679 A | 3/1999 | Salecker et al. |
| 5,878,624 A | 3/1999 | Showalter et al. |
| 5,899,829 A | 5/1999 | Salecker et al. |
| 5,951,436 A | 9/1999 | Kim |
| 5,970,811 A | 10/1999 | Imao et al. |
| 6,000,294 A | 12/1999 | Jackson et al. |
| 6,035,734 A | 3/2000 | Le Van |
| 6,073,507 A | 6/2000 | Ota et al. |
| 6,082,215 A | 7/2000 | Jerwick |
| 6,108,600 A | 8/2000 | Lehner et al. |
| 6,140,898 A | 10/2000 | Satoh et al. |
| 6,155,126 A | 12/2000 | Vogt et al. |
| 6,230,577 B1 | 5/2001 | Showalter et al. |
| 6,234,061 B1 | 5/2001 | Glasson |
| 6,234,933 B1 * | 5/2001 | Tornatore ............ 477/78 |
| 6,257,082 B1 | 7/2001 | Ore |
| 6,258,009 B1 | 7/2001 | Thomas et al. |
| 6,269,708 B1 | 8/2001 | Engenhorst et al. |
| 6,301,984 B1 | 10/2001 | Petzold |
| 6,361,473 B1 | 3/2002 | Mason et al. |
| 6,370,980 B1 | 4/2002 | Olsson et al. |
| 6,374,688 B1 | 4/2002 | Böckmann et al. |
| 6,415,214 B2 | 7/2002 | Nishimura et al. |
| 6,591,704 B2 * | 7/2003 | Kamiya et al. ............ 74/335 |
| 2002/0035013 A1 | 3/2002 | Saito |
| 2002/0100658 A1 | 8/2002 | Williams et al. |
| 2003/0014173 A1 | 1/2003 | Loeffler et al. |
| 2003/0029261 A1 | 2/2003 | DeJonge |

FOREIGN PATENT DOCUMENTS

| | | |
|---|---|---|
| DE | 196 01 291 A1 | 7/1997 |
| EP | 0 046 845 B1 | 3/1982 |
| EP | 0 161 521 B1 | 11/1985 |
| EP | 0 410 593 B1 | 1/1991 |
| EP | 0 533 370 B1 | 3/1993 |
| EP | 0 565 257 A1 | 10/1993 |
| EP | 0 601 741 B1 | 6/1994 |
| EP | 0 857 894 B1 | 8/1998 |
| EP | 1 020 666 B1 | 7/2000 |
| EP | 1 207 321 A2 | 5/2002 |
| GB | 2 226 092 A | 6/1990 |
| GB | 2 290 359 A | 12/1995 |
| GB | 2 315 526 | 2/1998 |
| GB | 2 370 326 A | 6/2002 |
| GB | 2 371 607 A | 7/2002 |
| WO | WO 99/32808 | 7/1999 |
| WO | WO 00/65299 | 11/2000 |
| WO | WO 03/018974 | 3/2003 |

* cited by examiner

MODULATED SYNCHRONIZER ENGAGEMENT

|  |  | AMPS | kPa |
|---|---|---|---|
| SYNCH. VALVE I1 | I1 | 0.4 | 600 |
| SYNCH. VALVE I2 | I2 | 1.1 | 1460 |

|  | LOOPS |
|---|---|
| SYNCH1PULSE | 1 |
| SYNCH2PULSE | 1 |
| SYNCH3PULSE | 1 |
| SYNCH4PULSE | 1 |
| SYNCH5PULSE | 1 |

|  | BEG (kPa) | END (kPa) | SLIP (LOOPS) |
|---|---|---|---|
| 1F->2F | 455 | 1460 | 6 |
| 2F->3F | 455 | 900 | 6 |
| 3F->4F | 455 | 900 | 6 |
| 4F->5F | 455 | 1000 | 6 |
| 1R->2R | 455 | 1460 | 6 |
| 2R->3R | 455 | 900 | 6 |
| 5F->4F | 455 | 1000 | 6 |
| 4F->3F | 455 | 1200 | 6 |
| 3F->2F | 455 | 1460 | 6 |
| 2F->1F | 455 | 1460 | 6 |
| 3R->2R | 455 | 1460 | 6 |
| 2R->1R | 455 | 1460 | 6 |

FIG. 6

AUTOMATED MANUAL TRANSMISSION AND SHIFT METHOD

TECHNICAL FIELD

The present invention relates to the field of automated manual transmissions. More specifically, the present invention relates to an automated transmission and a method of controlling the gearshifts of an automated manual transmission.

BACKGROUND

In a conventional manual transmission, a mechanical linkage is provided between the gearshift lever and the one or more shift rods of the transmission. By moving the shift lever into a selected gear position, the linkage can move one of the shift rods in the transmission, thereby selecting the appropriate gear in the gearbox. Automated manual transmissions have been introduced in order to remove the need for the mechanical linkage between the shift lever and shift rods. In place of the mechanical linkage, hydraulic pistons may be provided at either end of each shift rod. Each shift rod may also provided with solenoid shift rod valves at either end thereof to control hydraulic pressure on the pistons.

When in neutral, the hydraulic pressure at either end of the shift rod balances the rod in the centered, neutral position. Once the position of the gear lever indicates the desired gear, one of the solenoid shift rod valves will be instructed to release the fluid at one end of the shift rod. The rod will then move under the hydraulic pressure at the opposite end in order to engage the desired gear. An example of such a system is disclosed in U.S. Pat. No. 6,301,984 to Petzold, which also includes position sensors that are used to ensure that the hydraulic pistons to not strike stop surfaces after the desired gear is selected.

As in a conventional manual transmission, automated manual transmissions still retain synchronizers to assist in the engagement of the selected gear. However, even with automated manual transmissions provided with synchronizers, the engagement of the shift collar with the selected gear is often abrupt, as it is controlled by an electronic controller rather than by the feel of the vehicle operator. This abrupt engagement of the gear can make it difficult for an operator to operate a vehicle smoothly, thereby increasing operator fatigue. Furthermore, the abrupt engagement also means that the power transmission efficiency of automated manual transmissions is not as great as that obtained with conventional manual transmissions.

It is an aim of the present invention to solve one or more of the problems set forth above.

SUMMARY OF THE INVENTION

According to a first aspect of the present invention, there is provided a method of selecting a gear in an automated manual transmission. The transmission includes an actuation mechanism for actuating at least one shift collar that is engageable with a selected gear. The method includes the step of moving the shift collar into a neutral position. The actuation mechanism is then engaged to produce an initial engagement force on the shift collar, thereby moving the shift rod and collar towards the selected gear. The rotational speeds of the collar and selected gear are then adjusted until they reach a predetermined rotational speed differential. The method also includes modulating the initial engagement force during the speed adjustment step and applying a final engagement force to the shift collar following the modulation step, so as to effect the full engagement of the selected gear.

According to a second aspect of the present invention, there is provided an automated manual transmission. The transmission includes a plurality of gears and at least one shift collar engageable with at least one of the plurality of gears. The transmission also includes an actuation mechanism for actuating the at least one shift collar and at least one synchronizer for adjusting the rotational speed differential between the shift collar and the at least one gear. The transmission also has a control system which engages the actuation mechanism so as to apply an initial engagement force to the shift collar such that the shift rod and collar move towards the at least one gear. Furthermore, the control system is adapted to modulate the initial engagement force when the synchronizer is adjusting the rotational speed differential between the shift collar and the at least one gear. The control system is also adapted to apply a final engagement force to the shift collar following the modulation of the initial engagement force.

Other features and aspects of the present invention will become apparent from the following description and the accompanying drawings.

DETAILED DESCRIPTION

Figure 1:
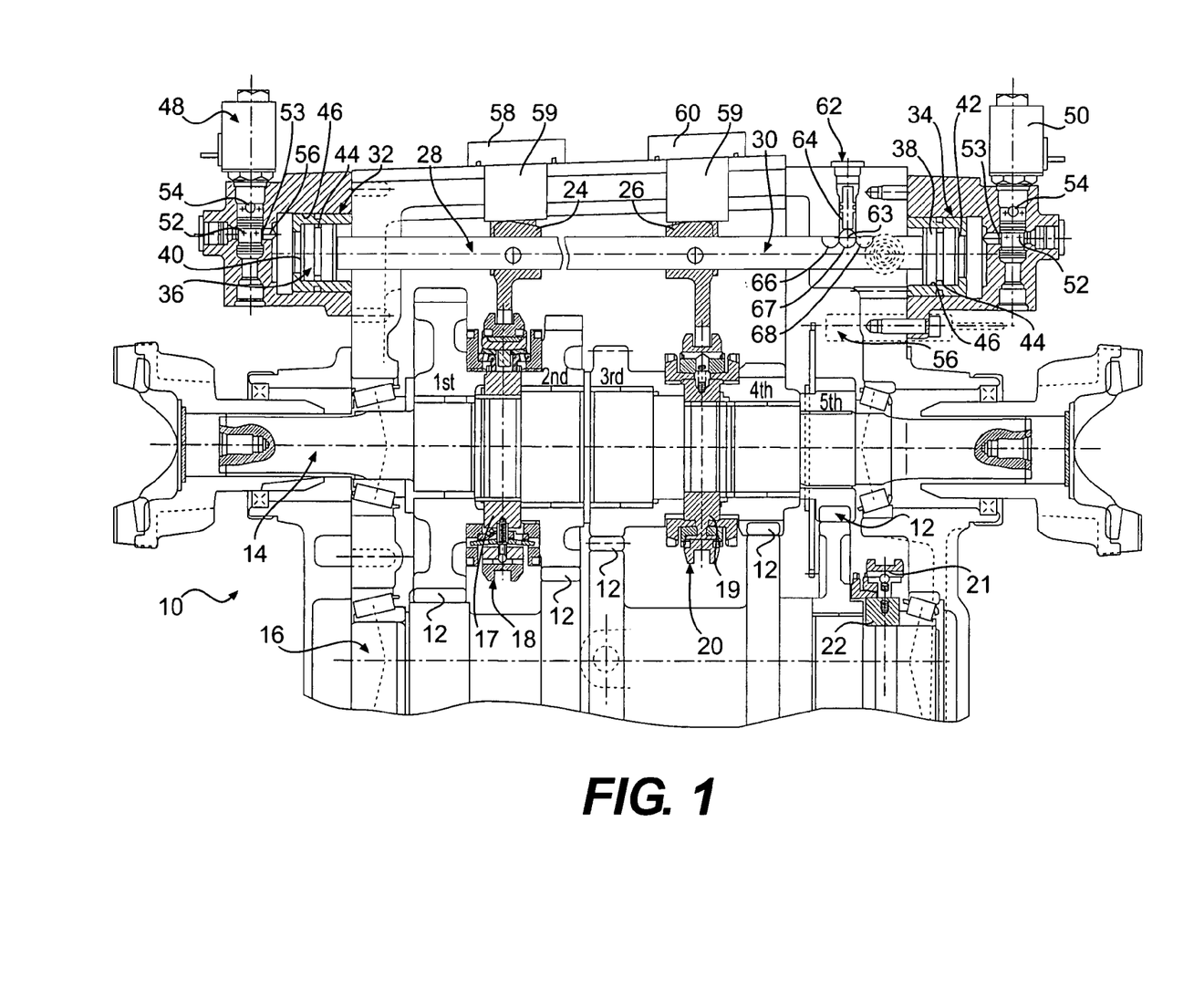
FIG. 1 is a schematic vertical section through a gearbox of an automated manual transmission.

A vertical section through a gearbox for use in an automated manual transmission is shown in FIG. 1. The gearbox illustrated, generally designated 10, is a five-speed gearbox of conventional layout. Thus, the five forward gears 12 are located on an output shaft 14 and the teeth of each gear engage with those on a corresponding countershaft 16. First, second and third shift collars 17,19,21 are also provided. The shift collars 17,19,21 each include a synchronizer 18,20,22 for adjusting the rotational speed of the collars 17,19,21 when engaging a gear: the first synchronizer 18 engaging the first and second gears; the second synchronizer 20 engaging the third and fourth gears; and the third synchronizer engaging fifth gear. Although the example embodied here has five speeds, it will be understood that the transmission of the present invention may have any number of gears.

The first and second collars 17,19 and their respective synchronizers 18,20 are held on first and second shift forks 24,26. The shift forks 24,26 themselves are located on first and second shift rods 28,30. For illustrative purposes, both shift rods 28,30 are partially visible in the schematic view of FIG. 1. With this arrangement of the gearbox components, the movement of the first shift rod 28 controls the engagement of the first collar 17 with the first and second gears 12, and the movement of the second shift rod 30 controls the engagement of the second collar 19 with the third and fourth gears 12. It will of course be understood by the skilled person that the synchronizer arrangement shown in FIG. 1 is only one of a number of alternative arrangements. For example, an alternative arrangement would be for the synchronizers to be provided on the gears themselves, rather than on the shift collars. These and any other known synchronizer arrangements can be utilized with the transmission shown here.

The first and second shift rods 28,30 are operated in the same manner. Both shift rods 28,30 are provided with first and second piston assemblies 32,34 at either end thereof. The piston assemblies 32,34 are each comprised of a piston head 36,38 located within a fluid chamber 40,42. Each piston head 36,38 is fixed to a respective end of the shift rod 28,30 and is provided with an O-ring 44 to ensure a sealing fit between the piston head 36,38 and the inner wall 46 of the fluid chamber 40,42. In this way, fluid entering the fluid chambers 40,42 provides the axial movement of the shift rods 28,30.

The transmission further includes first and second shift rod valves 48,50 for each shift rod 28,30. The valves 48,50 control the filling and draining of fluid into the fluid chambers 40,42. The overall control of fluid flow will be described in more detail below with particular reference to FIGS. 3 and 4, but the shift rod valves 48,50 themselves are substantially conventional, in that each is a three-way valve having an inlet 52, an outlet 53 and an exhaust 54. Each inlet 52 communicates with a fluid supply line (not shown in FIG. 1), while each exhaust communicates with a fluid return line (not shown in FIG. 1). The outlet 53 of each valve 48,50 communicates with a fluid passage 56 in each piston assembly 32,34 to allow both the inlet 52 and exhaust 54 of each valve 48,50 to also communicate with the respective fluid chambers 40,42. Thus, the flow of fluid into and out of the fluid chambers 40,42 can be controlled by the shift rod valves 48,50.

The transmission is also provided with spring-loaded detents 62 for engaging the shift rods 28,30 once the rods 28,30 are in the desired position. Each detent 62 comprises a ball 63 that is biased towards the shift rod 28,30 by a spring 64. Each shift rod 28,30 is provided with a set of three recesses: a left recess 66, a center recess 67, and a right recess 68. The spring 64 will bias the ball 63 into one of the recesses 66,67,68, depending on the position of the shift rods 28,30. When the ball 63 locates in either the left or right recess 66,68, the shift rod 28,30 is in a gear engagement position. When the ball 63 locates in the center recess 67, the shift rod 28,30 is in the neutral position. For example, when the first shift rod 28 has been moved to the right to engage second gear, the ball 63 will locate in the left recess 66. If the first shift rod 28 is in the neutral position, the ball 63 will locate in the center recess 67, and if the shift rod 28 is moved to the left for the engagement of first gear, the ball 63 will locate in the right recess 68. The force of the spring 64 is sufficient to hold the ball 63 in one of the recesses 66,67,68 and consequently hold the shift rod 28,30 in position when the fluid at either end of the shift rod 28,30 is vented through the exhaust 54. However, the force of the spring 64 is selected only to hold the shift rod 28,30 in position when no hydraulic pressure is being applied to the ends of the rod 28,30. Hydraulic pressure applied at either end of the rod 28,30 will be able to move the rod 28,30 against the force of the spring 64 in the detent 62.

Figure 2A:
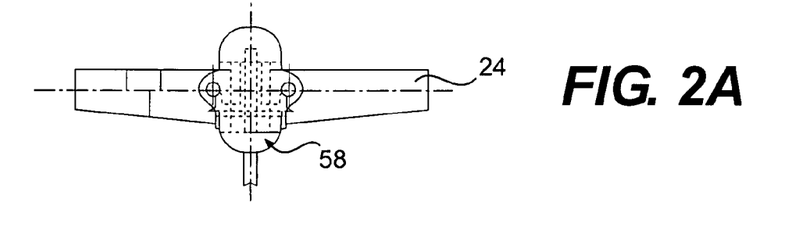
FIGS. 2(a)–(c) are plan, front, and side views, respectively, of a shift fork from the gearbox of FIG. 1.
Figure 2B:
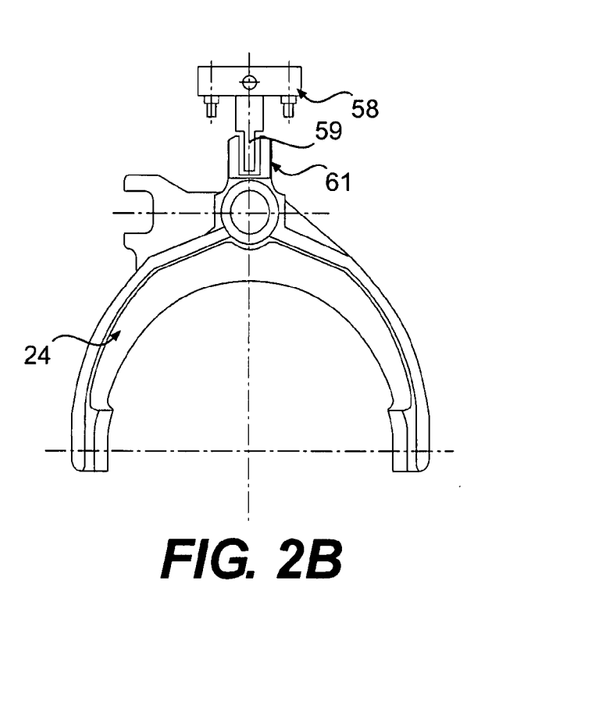
Figure 2C:
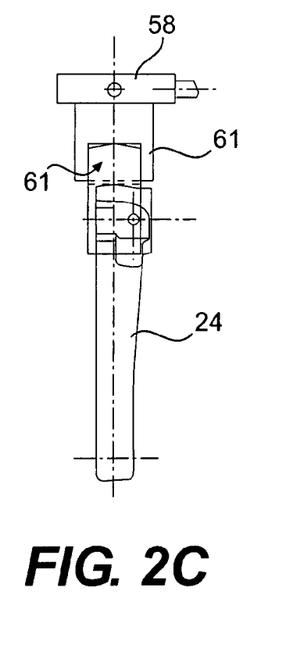

The gearbox 10 is also provided with detection means whereby the position of the shift forks 24,26 may be monitored in order to detect whether the gearbox is in a gear, engaging a gear, or in neutral. This detection means comprises first and second position sensors 58,60 which are located adjacent the first and second shift forks 24,26, respectively, of the first and second shift rods 28,30. As best illustrated in FIGS. 2(a)–(c), the sensors 58,60 are non-contact position sensors, a suitable example of which is manufactured by Gill Instruments Limited of Lymington, United Kingdom. The sensors 58,60 use inductive technology and are made up of a sensor plate 59 fixed to the gearbox casing and a ferrous activator 61 which is incorporated into the shift forks 24,26, as compared to prior designs that utilize activators that are not integrated into the shift forks and that are typically physically spaced from the shift forks. In the illustrated embodiment, the activator 61 is generally U-shaped so that the fixed plate 59 passes through the activator 61 when the fork 24,26 moves relative to the plate 59. As the shift forks 24,26 move on their respective shift rods 28,30, the activators 61 move with respect to the fixed sensor plate 59, and a signal is then sent to the control system to indicate the position of the shift fork 24,26. The control system is calibrated with positional data which will be compared with the present position of the shift fork 24,26 so that the system will know from the position of the shift fork 24,26 whether the transmission is in gear, in the process of engaging a gear or else in neutral.

Figure 3:
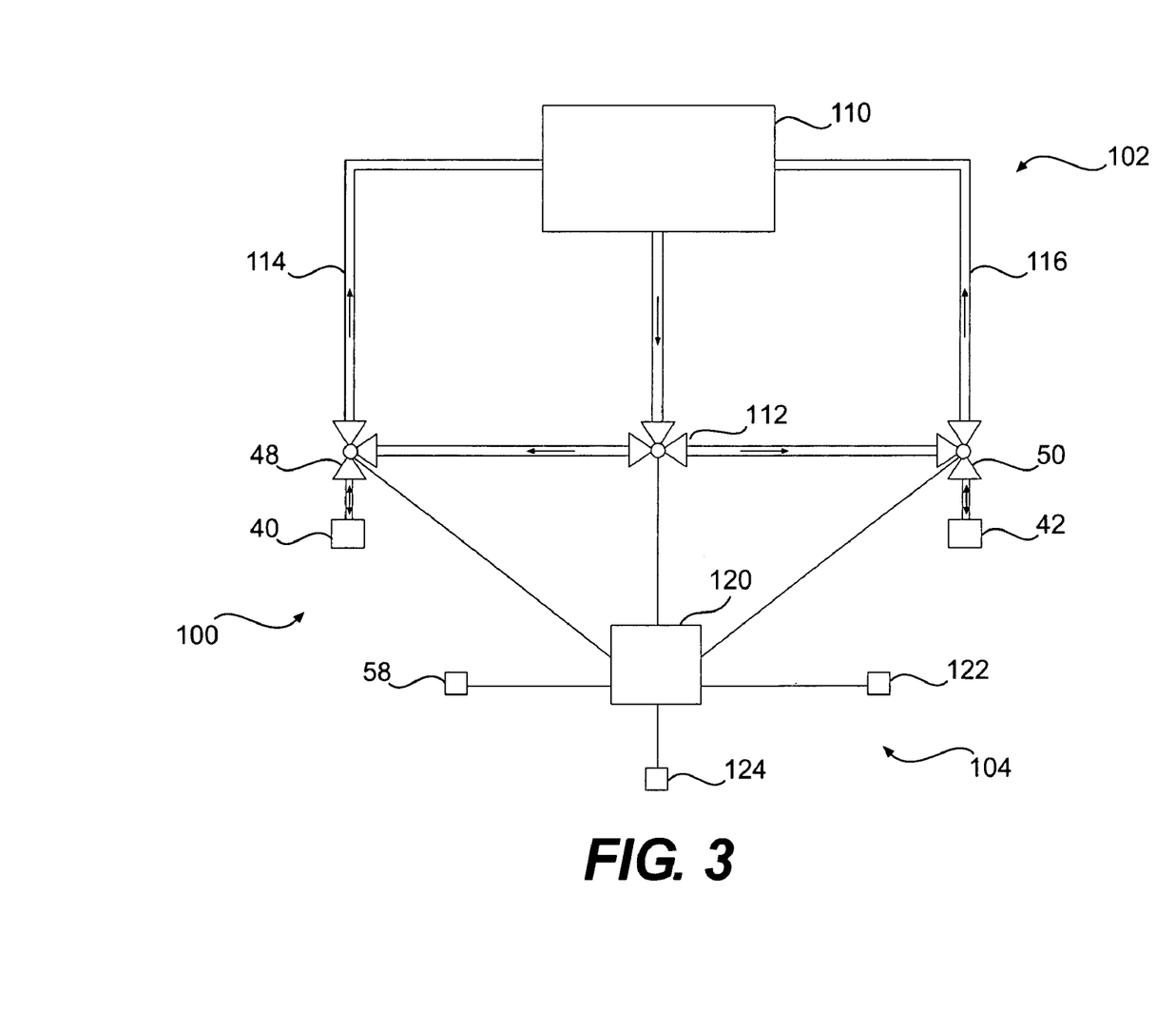
FIG. 3 is a schematic view of a control system for the automated manual transmission.

FIG. 3 shows a schematic view of the control system 100 of an automated manual transmission. For illustrative purposes, only the control system 100 relating to the first shift rod 28 (for selecting first or second gear) is shown. However, it should be understood that an identical system is provided for each shift rod of the transmission.

The control system 100 comprises a hydraulic actuation mechanism and an electronic control circuit 104. The hydraulic actuation mechanism is a hydraulic fluid circuit 102 that includes a fluid reservoir 110 that holds hydraulic fluid to supply each fluid circuit 102 in the transmission. Alternatively, each fluid circuit may have a separate fluid reservoir. The fluid is pressurized by a pump (not shown) or similar pressurizing means. The reservoir supplies pressurized fluid to the fluid circuit 102 through a three-way control valve 112. The control valve 112 has two outlets that communicate with the inlets 52 of the first and second shift rod valves 48,50. Each of the first and second shift rod valves 48,50 is also part of the fluid circuit 102. The shift rod valves 48,50 are themselves three-way valves, as they each have an outlet 53 in fluid communication with the respective first and second fluid chambers 40,42, and an exhaust 54 in fluid communication with a return pipe 114,116 to the fluid reservoir 110.

The electronic control circuit 104 operates the control valve 112 and the shift rod valves 48,50 of the hydraulic circuit 102. The operation of the valves 112,48,50 is effected by an electronic control unit (ECU) 120, which also provides the overall control of the control system 100. As will be explained in greater detail below, the ECU 120 controls the shift rod valves 48,50 to allow fluid into the fluid chambers 40,42. The ECU 120 can set the control valve 112 at intermediate positions between the open and closed positions so as to adjust the flow of fluid therethrough, and thus modulate the hydraulic pressure in the fluid circuit 102. The control valve 112 may be a therefore a proportional valve, wherein the size of the valve opening is proportional, linear or otherwise, to the fluid flow therethrough.

It will be understood that although the schematic shown in FIG. 3 is only in respect of controlling the first shift rod 28, the ECU 120 can control the valves of the remaining shift rods, and hence the entire transmission, in the same manner. In a transmission with more than two gears, and hence more than one shift rod, the control system 100 will include fluid circuits 102 incorporating the control valve 112 and shift rod valves 48,50 for each shift rod, although only one fluid reservoir 110 and ECU 120 are necessary for the entire system 100.

The electronic control circuit 104 is also provided with a number of sensors in order to control the transmission. A shift lever sensor 122 is provided to monitor the position of the shift lever. Thus, when the operator selects a new gear or neutral, the shift lever sensor 122 will communicate this to the ECU 120. As described above with reference to FIGS. 1 and 2(a)–(c), the control circuit 104 is also provided with a position sensor 58 that monitors the position of the shift fork 24 in the transmission. Finally, the ECU 120 is also linked to a clutch actuator 124 so that it may engage and disengage the clutch when required.

Although the control system 100 of the illustrated embodiment incorporates a preferred hydraulic actuation mechanism, it should be understood that alternative actuation mechanisms may also be used for the application. For example, a suitable pneumatic actuation mechanism may be used instead, with pressurized gas providing the motive force to the shift rods, or an electrical actuation mechanism may be used, with electrical actuators providing motive force to the shift rods.

INDUSTRIAL APPLICABILITY

The control system 100 controls the valves, sensors and actuators of the transmission in order to apply a gear selection method to shift the transmission between gears. The transmission and control system can be utilized in any on- or off-highway vehicle for which an automated manual transmission would be suitable. In addition, the present invention may also be used with any stationary engine-driven apparatus having a transmission requirement, such as a generator or pump. The particular example described here is of an automated manual transmission for a work machine for use in construction, agriculture, earthmoving, forestry, or the like, and in particular for a telescopic material handling machine (i.e. telehandler), backhoe loader, or the like.

Figure 4:
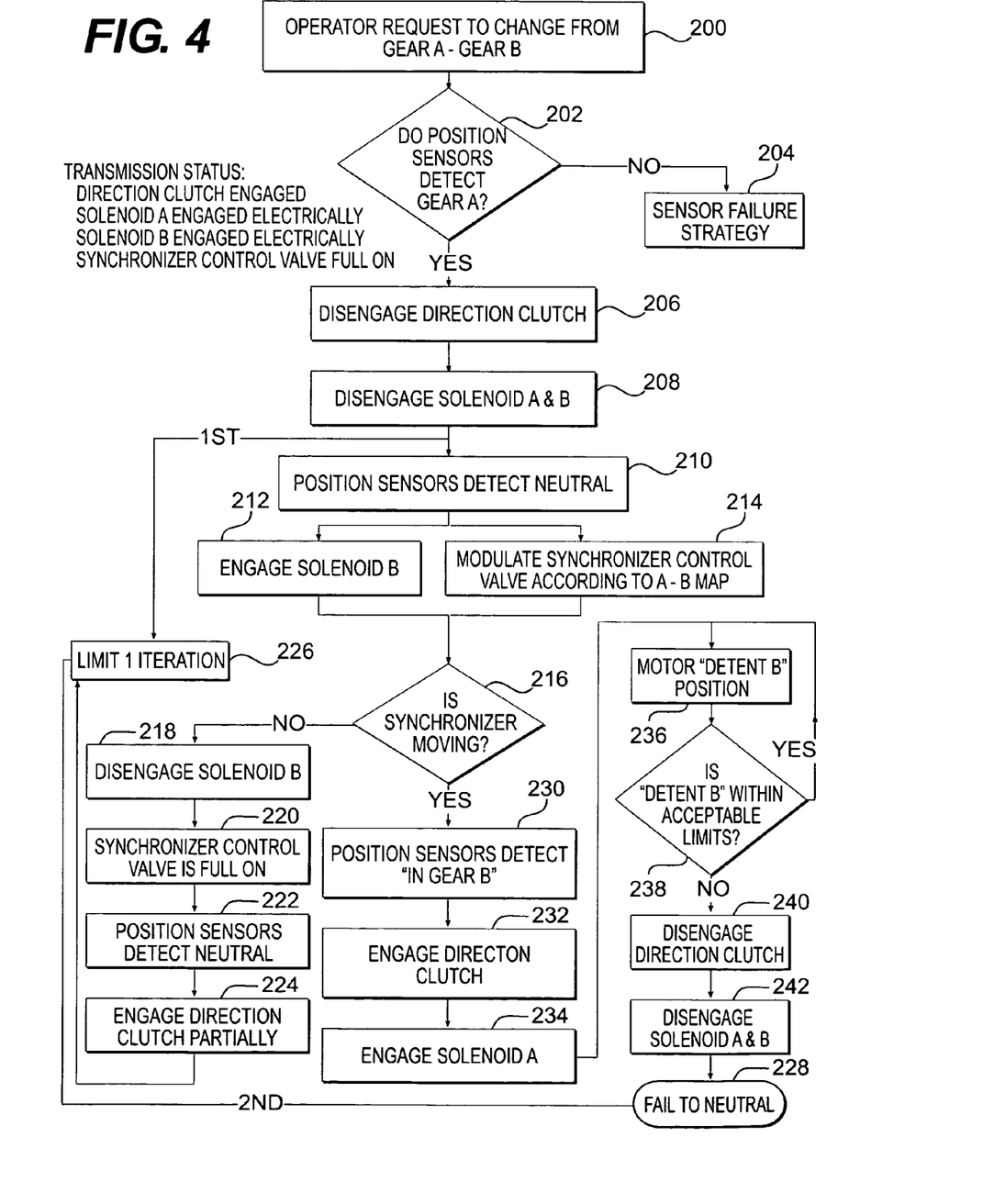
FIG. 4 is a flowchart showing the steps of a gear selection method applied by the control system of FIG. 3.

FIG. 4 shows a flowchart illustrating the gear selection, or shift control, method applied by the ECU of the control system each time the operator selects a new gear in the transmission. Again, the example will refer to the first shift rod 28 and the associated first and second gears. However, it will be understood that this method is applied to shift the transmission into and out of any gear in the transmission.

The first operation step 200 of the method is conducted when the ECU 120 receives a signal from the shift lever sensor 122 indicating that the operator has selected a new gear. For this example, the operator is shifting the transmission from first gear to second gear. Upon receipt of the shift signal, the ECU 120 applies a first query step 202 in order to determine whether the transmission is presently in first gear. The present gear is detected by a signal sent to the ECU 120 by the position sensor 58 monitoring the position of the shift fork 24.

If the position sensor 58 indicates that the transmission is not presently in first gear, then the ECU 120 concludes that there has been a sensor failure. In such an instance, the ECU applies a sensor failure strategy 204. The sensor failure strategy 204 is applied in order to ensure that the vehicle is not stranded due to the sensor failure. An example of a suitable strategy would be to advise the operator of the sensor failure and move the transmission into neutral. The ECU 120 can then apply a contingency strategy whereby the transmission may still be operated in the gears whose associated shift rod(s) still have fully functioning sensors. Thus, the operator can move the vehicle even though the most suitable gear is no longer available. This allows the vehicle to be moved out of danger should the sensor have failed when the vehicle is crossing railroad tracks or a busy traffic intersection, for example. Depending on the vehicle application, other strategies may also be utilized. For example, in heavy off-highway vehicles, it is desirable to have the transmission to remain in gear after sensor failure, rather than move into neutral where the operator could lose control of the vehicle.

If the position sensor 58 indicates that the transmission is indeed in the correct (first) gear, the ECU 120 will then apply a series of operation steps in order to change into the requested second gear. The second operation step 206 disengages the clutch via the clutch actuator 124. Immediately thereafter, the third operation step 208 is applied in order to move the shift rod into a neutral position. In the illustrated embodiment, this third step 208 is achieved by disengaging the actuation mechanism via shift rod valves 48,50 at either end of the shift rod 28. The ECU 120 communicates the disengagement signal to the two valves 48,50, which then open their outlets 53 to allow the pressurized hydraulic fluid into the fluid chambers 40,42. By providing equal hydraulic pressure to the piston heads 36,38 at either end of the shift rod 28, the shift rod 28 will move into a balanced, central, neutral position. The ECU 120 will determine when the shift rod 28 has correctly moved into the neutral position by way of a further signal from the position sensor 58, as represented by fourth operation step 210.

Following confirmation that the shift rod 28 is in the neutral position, the fifth and sixth operation steps 212,214 occur substantially simultaneously. In order to move into second gear, the ECU 120 applies the fifth operating step 212 in order to re-engage the actuation mechanism. In this particular example, the actuation mechanism is re-engaged by engaging the second shift rod valve 50. This engagement of the second shift rod valve 50 closes the valve inlet 52 and opens the exhaust 54 to allow the fluid to drain from the fluid chamber 42 back via the return pipe 116 to the fluid reservoir. Draining the fluid from the fluid chamber 42 removes the pressure and creates a force imbalance on the shift rod 28. The hydraulic pressure in fluid chamber 40 then produces an initial engagement force on the shift rod 28 and shift collar 17, moving them towards the second gear.

As the shift rod 28 and collar 17 move towards the second gear, the synchronizer 18 will come into contact with the second gear. As a result, the rotational speed differential between the collar 17 and gear will begin to decrease. However, the control system does not simply allow the shift rod 28 and collar 17 to move towards the second gear under the initial engagement force produced by the hydraulic pressure in fluid chamber 40. Rather, the pressure in the fluid circuit 102 and fluid chamber 40, and hence the initial engagement force, is modulated in the sixth operation step 214. The pressure modulation is carried out by the control valve 112 in the fluid circuit 102 under instructions from the ECU 120 and ensures a gradual engagement of the collar 17 and second gear. An example of the modulation of the hydraulic pressure is shown in FIG. 5.

Figure 5:
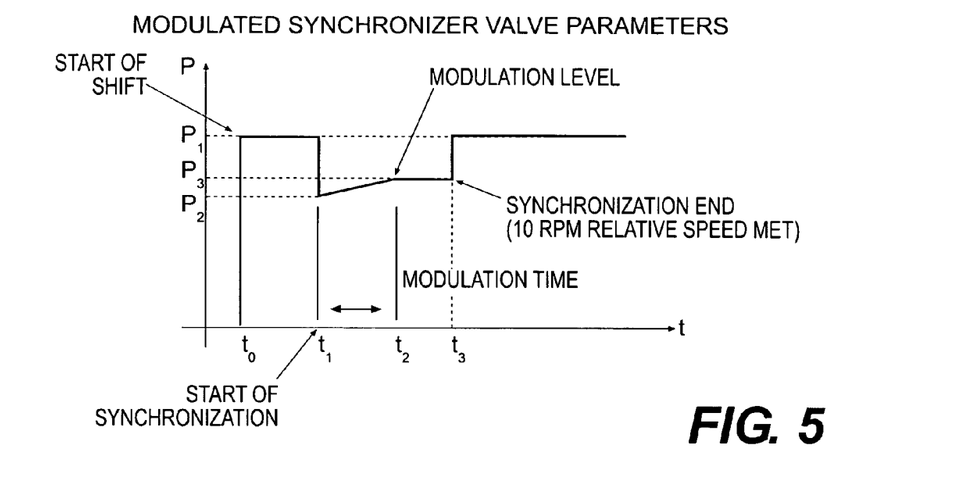
FIG. 5 is a graph illustrating the variation in hydraulic pressure applied by the control system to a shift rod of the gearbox of FIG. 1 during a gearshift.

As can be seen in the pressure/time graph of FIG. 5, an initial pressure P1 is provided in the fluid chamber 40 at time t0 following the fifth operation step 212. This pressure P1 produces an initial engagement force on the piston head 36 and, consequently, the shift rod 28. However, once the ECU 120 determines at time t1 via the position sensor 58 that the step of adjusting the rotational speed differential between the collar with the second gear is underway, the pressure P1 in fluid chamber 40 is reduced to pressure P2. This pressure reduction produces a resultant reduction in the initial engagement force on the piston head 36 and shift rod 28 to an intermediate, smaller engagement force. This force reduction produces a deceleration on the shift rod 28 and collar 17 during the rotational speed adjustment between the collar 17 and the second gear. As the adjustment of the speed differential continues, the control valve 112 is instructed by the ECU 120 to allow more hydraulic fluid through, gradually increasing pressure in fluid chamber 40 again to an intermediate pressure P3. This gradual increase in pressure produces a similarly gradual increase in the intermediate engagement force, which rises back towards the level of the initial engagement force. Thus, during the rotational speed adjustment step, the shift rod 28, collar 17 and synchronizer 18 are accelerated gradually again until time t2. The pressure P3 is then maintained until the rotational speed differential reaches a predetermined level at time t3. The completion of the speed adjustment step is established by the ECU 120 by comparing the rotational speeds of the collar 17 and gear communicated to the ECU 120 by speed sensors (not shown). The accuracy of the speed sensors is such that complete synchronization of the collar and gear (i.e. where the speed differential is reduced to zero) is not possible. Thus, the ECU will continue with the shift method once the speed differential has reached a suitable level, rather than await complete synchronization. In the illustrated embodiment, a suitable speed differential is 10–50 rpm, although 30 rpm is the most preferred differential.

When the speed differential has reached the predetermined level at time t3, the control valve 112 is instructed to open fully. This allows the pressure in the fluid chamber 40 to return to P1 and a final engagement force to be applied to the shift rod 28, ensuring the final, full engagement of second gear.

Figure 6:
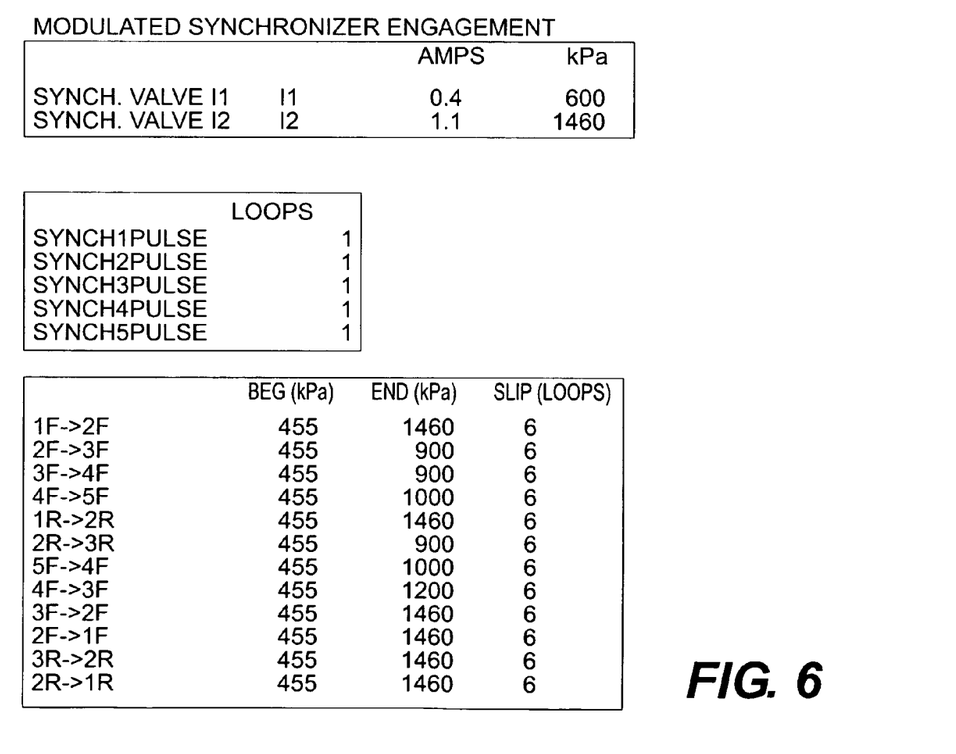
FIG. 6 is a table showing the hydraulic pressures applied by the control system at particular points during a gearshift.

Examples of suitable start and end pressures for the modulation step are shown in the table of FIG. 6. The table illustrates pressures to be applied in the modulation step for each gearshift in sequence for a transmission having five forward and three reverse gears. Each forward gear is designated by the letter F (e.g. 1F designating first forward gear) and each reverse gear is designated by the letter R (e.g. 3R designating third reverse gear). The table shows that the pressure P2 at the beginning of the rotational speed adjustment step (time t1) is 455 kPa for each shift. However, the pressure P3 at the end of the modulation step (time t2) varies depending on the particular shift being performed. These variations in P3 result from the larger pressures required to engage certain gears, particularly during downshifts. The final column of the table in FIG. 6 shows the time of the modulation step (t2−t1). The values given are for "loops", each of which is ten milliseconds in length. Therefore, as can be seen, the modulation step in each shift in this illustrated embodiment will take 6 "loops", which equates to 60 milliseconds. Again, it will be understood that the pressures used and the duration of the modulation step may be adjusted depending on the requirements of the particular transmission over which the system has control.

Once the ECU 120 has applied fifth and sixth operation steps 212 and 214 described above, the ECU 120 must then apply a second query step 216 in order to establish that the synchronizer 18 is moving as desired. If the synchronizer 18 is not moving, the engagement procedure must be recommenced. This is done by applying a number of iteration steps. A first iteration step 218 disengages the shift rod valve 50 before a second iteration step 220 instructs the control valve 112 to open fully. These iteration steps 218,220 will ensure that the pressure and resultant forces at either end of the shift rod 28 move the shift rod 28 into the neutral position once more. The ECU 120 will then apply a third iteration step 222 in order to confirm, via the position sensor 58, that the shift rod 28 is still in the neutral position.

The ECU 120 will then also apply a subsequent fourth iteration step 224 in order to briefly engage the clutch, via the clutch actuator 124. With the brief engagement of the clutch, the gears will be rotated by the countershaft 16. In doing so, this ensures that the gear is not in the same rotational position when the system tries once more to engage the gear. In some instances, gear engagement is prevented because the engagement teeth on the desired gear come up against the teeth on the shift collar. The fourth iteration step 224 briefly engages the clutch to rotate the gear to remove the possibility of the teeth of the gear and collar coming into contact on the next attempt to engage the gear.

Following the fourth iteration step 224, the ECU 120 applies an iteration query step 226 to determine whether the engagement problem detected at the second query step 216 is a recurring one. If the iteration query step 226 determines that this is the first time that the synchronizer 18 has not moved, then the iteration query step 226 will allow the ECU 120 to perform another attempt, beginning again at the fourth operation step 210. However, if the iteration query step 226 indicates that this is the second time in succession that engagement has not been achieved—which indicates a fault with the transmission—the ECU 120 will implement a further failure strategy 228. This failure strategy will again ensure the transmission remains in neutral, to avoid damaging the transmission.

Referring back to the second query step 216, if the position sensor 58 indicates to the ECU 120 that the synchronizer 18 is moving correctly, the ECU 120 will await a signal from the sensor 58 that the shift fork 24 is in the correct gear engagement position. This signal from the sensor 58, communicated to the ECU 120 at the eighth operation step 230, will indicate that second gear has now been fully engaged. Once the signal is received, the clutch will be fully engaged via a ninth operation step 232, and the shift rod valve 48 will be engaged in a tenth operation step 234. Engagement of the shift rod valve 48 drains the pressurized fluid from the fluid chamber 40. However, the shift rod 28 remains in position engaging second gear thanks to the ball 63 of the detent 62 locating in the left recess 66 of the shift rod 28.

Over time, components of the transmission may become worn, especially components such as the teeth of the shift collar and gears. Such wear can lead to the transmission jumping out of gear later in its operational life. In order to monitor the wear of these components, the ECU 120 monitors the position of the shift fork 24 when the transmission is in gear, via a first check step 236. The position sensor 58 will signal the ECU 120 if the shift fork 24 moves out of its gear engagement position by more than a predetermined distance, which will indicate that the transmission has jumped out of gear. The ECU 120 applies a check query step 238 to conduct the monitoring of the shift fork 24. If the position of the shift fork 24 is within acceptable limits (for example, within 0.5 mm of its optimum gear engagement position) the ECU 120 will apply the check step 236 and check query step 238 in a loop at selected time intervals until a new gear shift request is made by the operator. Once the new gear shift request is received, the ECU 120 will apply the shift control method again commencing at first operation step 200.

If during the check and check query step loop, the position sensor 58 signals that the shift fork 24 has moved outside the predetermined limit, and the transmission has thus jumped out of gear, the ECU 120 applies a further failure strategy. This failure strategy includes a first failure step 240 in which the clutch actuator 124 is instructed to disengage the clutch, and a further failure step 242 in which both shift rod valves 48,50 of the actuation mechanism are instructed to disengage. By disengaging the shift rod valves 48,50, the shift rod 28 will move back into the centered, neutral position, thus failing the transmission into neutral again at step 228.

As already explained, although the example described above only applies to a controlled shift between first and second gears, the system and method can be used in order to monitor and control each shift rod in a transmission, no matter how many gears the transmission has. In this way, any shift request made by the operator of the vehicle will have the same shift control method applied as that described above.

In providing a control method where the engagement force applied to the shift rods of the transmission can be modulated, the present invention may provide a more gradual engagement of selected gears during gearshifts. By modulating the engagement force on the shift rod when the rotational speeds of the shift collar and gear are being adjusted, the rod and its respective shift fork and collar experience a deceleration as they engage the gear. Once the rotational speed differential reaches its predetermined level, the engagement force is increased once more on the shift rod in order to complete the engagement of the gear. The modulation of the engagement force and resultant partial deceleration of the rod during engagement ensures that the engagement of the gear is less abrupt than with conventional automated manual transmissions. A transmission incorporating the control system described above and applying the control method of the present invention may therefore give a vehicle more predictable driving characteristics than a vehicle having a conventional automated manual transmission. Furthermore, the gradual engagement of the gear may ensure a greater efficiency of power transmission from the engine than in known arrangements.

Although various embodiments and aspects of this invention are described above, modifications may be made without departing from the scope of the following claims.

What is claimed is:

1. A method of selecting a gear in an automated manual transmission, the transmission including an actuation mechanism for actuating at least one shift rod, the shift rod adapted to engage a shift collar with a selected gear, the method including the steps of:
   (a) moving the shift rod into a neutral position;
   (b) engaging the actuation mechanism to produce an initial engagement force on the shift rod, thereby moving the shift rod and collar towards the selected gear; and
   (c) adjusting the rotational speeds of the collar and selected gear until they reach a predetermined rotational speed differential;
   wherein the method further includes the steps of:
   (d) modulating the initial engagement force during the speed adjustment step (c); and
   (e) applying a final engagement force to the shift rod following the modulation step, so as to effect the full engagement of the selected gear.

2. The method of claim 1, wherein the modulation step (d) includes reducing the initial engagement force to an intermediate engagement force smaller than the initial engagement force during the speed adjustment step (c).

3. The method of claim 2, wherein the modulation step (d) further includes increasing the intermediate engagement force towards the final engagement force over a predetermined period of time during the speed adjustment step.

4. The method of claim 1, wherein the transmission further includes a clutch, and the method further includes the initial step of disengaging the clutch prior to moving the shift rod into the neutral position.

5. The method of claim 4, wherein the method further includes the step of engaging the clutch once the selected gear is fully engaged.

6. The method of claim 1, wherein the transmission further includes at least one position determining sensor adapted to monitor the position of the at least one shift rod, and wherein the method further includes the steps of:
   (f) determining that the shift rod is in a neutral position; and
   (g) determining that the shift rod is in a gear engagement position following the application of the final engagement force.

7. The method of claim 6, further including the step of monitoring the shift rod position when the shift rod is in the gear engagement position.

8. The method of claim 7, further including the step of moving the shift rod to a neutral position following the application of the final engagement force should the position of the shift rod move outside a predetermined limit when in the gear engagement position.

9. A method of selecting a gear in an automated manual transmission, the transmission including an actuation mechanism for actuating at least one shift fork, the shift fork adapted to engage a shift collar with a selected gear, the method including the steps of:
   (a) moving the shift fork into a neutral position;
   (b) engaging the actuation mechanism to produce an initial engagement force on the shift fork, thereby moving the shift fork and collar towards the selected gear; and
   (c) adjusting the rotational speeds of the collar and selected gear until they reach a predetermined rotational speed differential;
   wherein the method further includes the steps of:
   (d) modulating the initial engagement force during the speed adjustment step (c); and
   (e) applying a final engagement force to the shift fork following the modulation step, so as to effect the full engagement of the selected gear.

10. The method of claim 9 wherein said shift fork is engaged with a shift rod that is actuated by the actuating mechanism.

11. The method of claim 9, wherein the modulation step (d) includes reducing the initial engagement force to an intermediate engagement force smaller than the initial engagement force during the speed adjustment step (c).

12. The method of claim 11, wherein the modulation step (d) further includes increasing the intermediate engagement force towards the final engagement force over a predetermined period of time during the speed adjustment step.

13. The method of claim 9, wherein the transmission further includes a clutch, and the method further includes the initial step of disengaging the clutch prior to moving the shift fork into the neutral position.

14. The method of claim 13, wherein the method further includes the step of engaging the clutch once the selected gear is fully engaged.

15. The method of claim 9, wherein the transmission further includes at least one position determining sensor adapted to monitor the position of the at least one shift fork, and wherein the method further includes the steps of:
(f) determining that the shift fork is in a neutral position; and
(g) determining that the shift fork is in a gear engagement position following the application of the final engagement force.

16. The method of claim 15, further including the step of monitoring the shift fork position when the shift rod is in the gear engagement position.

17. The method of claim 16, further including the step of moving the shift fork to a neutral position following the application of the final engagement force should the position of the shift fork move outside a predetermined limit when in the gear engagement position.

18. A method of selecting a gear in an automated manual transmission, the transmission including an actuation mechanism for actuating at least one shift collar engageable with a selected gear, the method including the steps of:
(a) moving the shift collar into a neutral position;
(b) engaging the actuation mechanism to produce an initial engagement force on the shift collar, thereby moving the shift collar towards the selected gear; and
(c) adjusting the rotational speeds of the collar and selected gear until they reach a predetermined rotational speed differential;
wherein the method further includes the steps of:
(d) modulating the initial engagement force during the speed adjustment step (c); and
(e) applying a final engagement force to the shift collar following the modulation step, so as to effect the full engagement of the selected gear.

19. The method of claim 18 wherein said shift collar is engaged with a shift fork that is actuated by the actuating mechanism.

20. The method of claim 19 wherein said shift fork is engaged with a shift rod that is actuated by the actuating mechanism.

21. The method of claim 18, wherein the modulation step (d) includes reducing the initial engagement force to an intermediate engagement force smaller than the initial engagement force during the speed adjustment step (c).

22. The method of claim 21, wherein the modulation step (d) further includes increasing the intermediate engagement force towards the final engagement force over a predetermined period of time during the speed adjustment step.

23. The method of claim 18, wherein the transmission further includes a clutch, and the method further includes the initial step of disengaging the clutch prior to moving the shift collar into the neutral position.

24. The method of claim 23, wherein the method further includes the step of engaging the clutch once the selected gear is fully engaged.

25. The method of claim 18, wherein the transmission further includes at least one position determining sensor adapted to monitor the position of the at least one shift collar, and wherein the method further includes the steps of:
(f) determining that the shift collar is in a neutral position; and
(g) determining that the shift collar is in a gear engagement position following the application of the final engagement force.

26. The method of claim 25, further including the step of monitoring the shift collar position when the shift rod is in the gear engagement position.

27. The method of claim 26, further including the step of moving the shift collar to a neutral position following the application of the final engagement force should the position of the shift collar move outside a predetermined limit when in the gear engagement position.

28. An automated manual transmission including:
a plurality of gears;
at least one shift rod adapted to engage a shift collar with at least one of the plurality of gears;
an actuation mechanism for actuating the at least one shift rod;
at least one synchronizer for adjusting the rotational speed differential between the shift collar and the at least one gear; and
a control system which engages the actuation mechanism so as to apply an initial engagement force to the shift rod such that the shift rod and collar move towards the at least one gear;
wherein the control system is adapted to modulate the initial engagement force when the synchronizer is adjusting the rotational speed differential between the shift collar and the at least one gear, and to apply a final engagement force to the shift rod following the modulation of the initial engagement force.

29. The transmission of claim 14, further including at least one position determining sensor adapted to monitor the position of the at least one shift rod.

30. The transmission of claim 14, wherein the at least one shift rod has a biased mechanical detent adapted to hold the shift rod in one of a number of neutral or gear engagement positions.

31. The transmission of claim 14, wherein the actuation mechanism is a hydraulic actuation mechanism including a hydraulic fluid circuit and a control valve located in the hydraulic fluid circuit, the control valve being adapted to modulate the hydraulic pressure in the hydraulic fluid circuit in response to commands from the control system.

32. An automated manual transmission, including:
a plurality of gears;
at least one shift fork adapted to engage a shift collar with at least one of the plurality of gears;
an actuation mechanism for actuating the at least one shift fork;
at least one synchronizer for adjusting the rotational speed differential between the shift collar and the at least one gear; and
a control system which engages the actuation mechanism so as to apply an initial engagement force to the shift fork such that the shift fork and collar move towards the at least one gear;
wherein the control system is adapted to modulate the initial engagement force when the synchronizer is adjusting the rotational speed differential between the shift collar and the at least one gear, and to apply a final engagement force to the shift fork following the modulation of the initial engagement force.

33. The method of claim 32 wherein said shift fork is engaged with a shift rod that is actuated by the actuating mechanism.

34. The transmission of claim 32, further including at least one position determining sensor adapted to monitor the position of the at least one shift fork.

35. The transmission of claim 32, further including a biased mechanical detent adapted to hold the shift fork in one of a number of neutral or gear engagement positions.

36. The transmission of claim 32, wherein the actuation mechanism is a hydraulic actuation mechanism including a hydraulic fluid circuit and a control valve located in the hydraulic fluid circuit, the control valve being adapted to modulate the hydraulic pressure in the hydraulic fluid circuit in response to commands from the control system.

37. An automated manual transmission, including:
a plurality of gears;
at least one shift collar engageable with at least one of the plurality of gears;
an actuation mechanism for actuating the at least one shift collar;
at least one synchronizer for adjusting the rotational speed differential between the shift collar and the at least one gear; and
a control system which engages the actuation mechanism so as to apply an initial engagement force to the shift collar such that the shift collar moves towards the at least one gear;
wherein the control system is adapted to modulate the initial engagement force when the synchronizer is adjusting the rotational speed differential between the shift collar and the at least one gear, and to apply a final engagement force to the shift collar following the modulation of the initial engagement force.

38. The method of claim 37 wherein said shift collar is engaged with a shift fork that is actuated by the actuating mechanism.

39. The method of claim 38 wherein said shift fork is engaged with a shift rod that is actuated by the actuating mechanism.

40. The transmission of claim 37, further including at least one position determining sensor adapted to monitor the position of the at least one shift collar.

41. The transmission of claim 37, further including a biased mechanical detent adapted to hold the shift collar in one of a number of neutral or gear engagement positions.

42. The transmission of claim 37, wherein the actuation mechanism is a hydraulic actuation mechanism including a hydraulic fluid circuit and a control valve located in the hydraulic fluid circuit, the control valve being adapted to modulate the hydraulic pressure in the hydraulic fluid circuit in response to commands from the control system.

* * * * *